US012688407B2

(12) United States Patent
Davis et al.

(10) Patent No.: US 12,688,407 B2
(45) Date of Patent: Jul. 21, 2026

(54) RADIO-FREQUENCY PHOTONIC ARCHITECTURE FOR DEEP NEURAL NETWORKS, SIGNAL PROCESSING, AND COMPUTING

(71) Applicant: Massachusetts Institute of Technology, Cambridge, MA (US)

(72) Inventors: Ronald A. Davis, Las Cruces, NM (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 871 days.

(21) Appl. No.: 18/149,249

(22) Filed: Jan. 3, 2023

(65) Prior Publication Data

US 2023/0281437 A1 Sep. 7, 2023

Related U.S. Application Data

(60) Provisional application No. 63/315,403, filed on Mar. 1, 2022.

(51) Int. Cl.
| | |
|---|---|
| *H04B 10/04* | (2006.01) |
| *G06N 3/065* | (2023.01) |
| *G06N 3/067* | (2006.01) |

(52) U.S. Cl.
CPC ........... *G06N 3/0675* (2013.01); *G06N 3/065* (2023.01)

(58) Field of Classification Search
CPC .. H04B 10/516; H04B 10/532; H04B 10/548; H04B 10/541; H04B 10/505;

(Continued)

(56) References Cited

U.S. PATENT DOCUMENTS

| | | | | |
|---|---|---|---|---|
| 8,213,806 | B2 * | 7/2012 | Griffin | ............... H04B 10/5561 |
| | | | | 398/198 |
| 8,842,992 | B2 * | 9/2014 | Middleton | ............. H04B 10/00 |
| | | | | 398/208 |
| 2007/0041735 | A1 * | 2/2007 | Darcie | .................. H04B 10/66 |
| | | | | 398/186 |

OTHER PUBLICATIONS

Davis et al., "Frequency-Encoded Deep Learning with Speed-of-Light Dominated Latency," arXiv:2207.06883v1 [cs.ET], https://doi.org/10.48550/arXiv.2207.06883, Jul. 8, 2022, 27 pages.

(Continued)

*Primary Examiner* — Hanh Phan
(74) *Attorney, Agent, or Firm* — Smith Baluch LLP

(57) ABSTRACT

A multiplicative analog frequency transform optical neural network (MAFT-ONN) encodes data in the frequency domain, achieves matrix-vector products in a single shot using photoelectric multiplication, and uses a single electro-optic modulator for the nonlinear activation of all neurons in each layer. Photoelectric multiplication between radio frequency (RF)-encoded optical frequency combs allows single-shot matrix-vector multiplication and nonlinear activation, leading to high throughput and ultra-low latency. This frequency-encoding scheme can be implemented with several neurons per hardware spatial mode and allows for an arbitrary number of layers to be cascaded in the analog domain. For example, a three-layer DNN can compute over four million fully analog operations and implement both a convolutional and fully connected layer. Additionally, a MAFT-ONN can perform analog DNN inference of temporal waveforms like voice or radio signals, achieving bandwidth-limited throughput, speed of light-limited latency, and fully analog complex-valued matrix operations.

20 Claims, 8 Drawing Sheets

(58) Field of Classification Search
CPC ............ H04B 10/5165; H04B 10/2575; H04B
10/25753; H04B 10/64; H04B 10/142;
G06N 3/0675; G06N 3/065
USPC ....... 398/182, 183, 185, 186, 187, 188, 115,
398/158, 159, 135, 136, 202, 208, 209,
398/25, 26, 27, 33, 38, 204, 203, 206,
398/207, 116
See application file for complete search history.

(56) References Cited

OTHER PUBLICATIONS

Dingel, "Ultra-linear, broadband optical modulator for high performance analog fiber link system," 2004 IEEE International Topical Meeting on Microwave Photonics (IEEE Cat. No. 04EX859). IEEE, 2004, pp. 241-244.
Hamerly et al. "Large-scale optical neural networks based on photoelectric multiplication." Physical Review X 9.2 (2019): 021032 12 pages.
Liang et al. "Digital suppression of both cross and inter-modulation distortion in multi-carrier RF photonic link with down-conversion." Optics Express 22.23 (2014): 28247-28255.
Pant et al "High-dimensional unitary transformations and boson sampling on temporal modes using dispersive optics." Physical Review A 93.4 (2016): 043803, 9 pages.
Ren et al. "Regularized 2-D complex-log spectral analysis and subspace reliability analysis of micro-Doppler signature for UAV detection." Pattern Recognition 69 (2017): 225-237.
Roy et al. "Machine learning in adversarial RF environments." IEEE Communications Magazine 57.5 (2019): 82-87.
Scotti et al., "A Mach-Zehnder modulator model for the design of optical-fiber analog transmitters," 2011 Workshop on Integrated Nonlinear Microwave and Millimetre-Wave Circuits, IEEE, 2011, pp. 1-4.
Shen et al. "Deep learning with coherent nanophotonic circuits." Nature Photonics 11.7 (2017): 441-446.
Xu et al. "11 TOPS photonic convolutional accelerator for optical neural networks." Nature 589.7840 (2021): 44-51.
Youssef et al. "Machine learning approach to RF transmitter identification." IEEE Journal of Radio Frequency Identification 2.4 (2018): 197-205.

* cited by examiner

RADIO-FREQUENCY PHOTONIC ARCHITECTURE FOR DEEP NEURAL NETWORKS, SIGNAL PROCESSING, AND COMPUTING

GOVERNMENT SUPPORT

This application claims the priority benefit, under 35 U.S.C. 119(e), of U.S. Application No. 63/315,403, filed on Mar. 1, 2022, which is incorporated herein by reference in its entirety for all purposes.

CROSS REFERENCE TO RELATED APPLICATION(S)

This invention was made with government support under CHE1839155 awarded by the National Science Foundation, and W911NF-21-2-0099 awarded by the U.S. Army Research Office. The government has certain rights in the invention.

BACKGROUND

Deep neural networks (DNNs) are revolutionizing computing and signal processing in applications ranging from image classification and autonomous robotics to life science. However, exponentially increasing DNN parameters and the large quantities of data are stretching the limits of present-day conventional computing architectures, primarily due to the von Neumann bottleneck in moving data from memory to processing. Tensor Processing Unit (TPU) SRAM, DRAM, and memristor architectures address this bottleneck by merging together the memory operations and matrix computations into single hardware elements, thereby increasing throughput.

Optical systems promise DNN acceleration by encoding, routing, and processing analog signals in optical fields, allowing for operation at the quantum-noise limit with high bandwidth and low energy consumption. Optical neural network (ONN) schemes rely on (i) performing linear algebra in the physics of optical components and/or (ii) in-line nonlinear transformations. To perform linear algebra, ONNs have used Mach-Zehnder interferometer (MZI) meshes, on-chip micro-ring resonators (MRRs), wavelength-division multiplexing (WDM), photoelectric multiplication, spatial light modulation, optical scattering, and optical attenuation. To perform in-line nonlinear transformations, ONNs have used optical-electrical-optical (OEO) elements and all-optical nonlinearities. However, to take full advantage of the potential ultra-low latency and energy consumption available in photonics, linear and nonlinear operations should be implemented together with minimal overhead. Simultaneously performing linear algebra and nonlinear transformations in ONNs in a way that preserves high hardware scalability and performance remains a challenge.

SUMMARY

A multiplicative analog frequency transform optical neural network (MAFT-ONN) architecture performs linear algebra and nonlinear transformations simultaneously for DNN inference with arbitrary scalability in DNN size and layer depth. A MAFT-ONN encodes neuron values in the amplitude and phase of frequency modes and photoelectric multiplication performs matrix-vector products in a single shot. A MAFT-ONN combines efficient optical matrix operations with in-line nonlinear transformations by electro-optic nonlinearities, enabling a scalable front-to-back photonic hardware accelerator for DNNs. This architecture enables DNN inference for an arbitrary number of layers using a simple hardware setup that maintains high throughput and ultra-low latency, which are useful performance metrics for applications like voice recognition, spectral channel monitoring, distributed sensing, and cognitive radio.

A MAFT-ONN can be implemented using analog techniques to multiply or convolve an input vector and a matrix. The input vector and matrix are frequency encoded onto first and second carrier signals, respectively, and mixed at or before a detector, which senses a heterodyne interference signal between them. These carrier signals can be optical signals or electrical signals; if they are electrical signals, they may be modulated onto optical signals. The heterodyne interference signal includes frequency-encoded products of elements of the input vector and elements of the matrix and spurious frequency content. Filtering the spurious frequency content from the heterodyne interference signal yields the product of the input vector and the matrix.

Frequency encoding the input vector onto the first optical signal can include modulating the first optical signal with a Mach-Zehnder modulator based on the input vector. The spurious frequency content can be filtered from the heterodyne interference signal using bandpass or periodic filtering. The frequency encoding of the matrix can be selected to yield the frequency-encoded products at frequencies interspersed with the spurious frequency content or in a band that does not include any of the spurious frequency content.

The input vector, matrix, and products can be the input activation vector to a layer of a neural network, the weight matrix of the neural network, and an output of the layer of the neural network, respectively. In this case, modulating a third optical signal with the frequency-encoded products yields an input activation vector of a subsequent layer of the neural network. If the third optical signal is modulated with a Mach-Zehnder modulator, the Mach-Zehnder modulator can be used to apply a nonlinearity in the subsequent layer of the neural network. The second optical signal can be one of many wavelength-division multiplexed (WDM) optical signals, in which case the weight matrix can be frequency encoded onto each of the WDM optical signals, which are then distributed to different layers of the optical neural network. Similarly, the first optical signal can be one of many WDM signals, each of which is frequency-encoded with a corresponding input vector, and all of these input-vector WDM signals can be processed at once, e.g., using appropriate fan-out techniques.

These techniques can also be used to multiply two matrices. The first and second matrices are frequency encoded onto first and second analog signals, respectively. The frequency encoding of the second matrix is at frequencies selected to produce an analog output signal with frequency components at predetermined frequencies. Multiplying the first and second analog signals together produces the analog output signal with frequency-encoded products of elements of the first and second matrices as well as spurious frequency content, which is filtered away.

MAFT techniques can also be used to perform frequency-domain convolutions of an input vector and a weight matrix. The frequency-domain convolution of signals W and X can be thought of as the cross-correlation of W and X minus the cross-correlation of X and W. If x[n] is the frequency-domain representation of the input vector and w[n] is the frequency-domain representation of the weight matrix, then an optical-domain MAFT processor, such as a MAFT-OON, computes the frequency-domain representation of the output vector as y[n]=(w*x)[n]−(x*w)[n], where * represents a cross-correlation, i.e., $$(x*w)[n] = \int_{m=-\infty}^{\infty} w[n+m]x[m].$$

A MAFT optical processor may include a laser, first and second single-sideband suppressed-carrier (SSB-SC) modulators, beam splitter, and photodetector (e.g., a balanced differential photodetector). In operation, the laser emits an optical carrier. The first SSB-SC modulators modulate a first copy of the optical carrier with a frequency-encoded version of an input vector as a first optical signal, and the second SSB-SC modulator modulates a second copy of the optical carrier with a frequency-encoded version of a matrix as a second optical signal. The beam splitter combines the first and second optical signals. And the photodetector detects a heterodyne interference signal between the first and second optical signals that includes frequency-encoded products of elements of the input vector and elements of the matrix.

The SSB-SC modulators can be dual-parallel Mach-Zehnder modulators (DPMZMs), each of which comprises a first Mach-Zehnder modulator (MZM) in a first arm of a Mach-Zehnder interferometer and a second MZM in a second arm of the Mach-Zehnder interferometer. The first and second MZMs are driven by in-phase and quadrature components, respectively, of the corresponding frequency-encoded signals.

If the optical processor multiplies the input vector and the matrix, then the heterodyne interference signal can include spurious frequency content, in which case there may be a filter, operably coupled to the photodetector, to filter the spurious frequency content from the heterodyne interference signal.

As discussed above, the input vector can be an input to a first layer of a neural network and the matrix can be a weight matrix of the neural network, in which case the optical processor can include a third SSB-SC modulator, operably coupled to the photodetector, that modulates a third copy of the optical carrier with heterodyne interference signal as an input to a second layer of the neural network. This third SSB-SC modulator can apply a nonlinearity of the neural network. Alternatively, the optical processor can include a switch that is operably coupled to an output of the photodetector and an input to the first SSB-SC modulator and that switches the heterodyne interference signal between the input to the first SSB-SC modulator and an output of the optical processor.

In other cases, the optical processor can operate on wavelength-division multiplexed input vectors and matrices. In some of these cases, the laser is a first laser, the optical carrier is a first optical carrier at a first wavelength, the input vector is a first input vector, the matrix is a first matrix, and the heterodyne interference signal is a first heterodyne interference signal. Such a processor also includes a second laser, third and fourth SSB-SC modulators, and first and second multiplexers. In operation, the second laser emits a second optical carrier at a second wavelength different that the first wavelength. The third SSB-SC modulator modulates a first copy of the second optical carrier with a frequency-encoded version of a second input vector as a third optical signal. The fourth SSB-SC modulator modulates a second copy of the second optical carrier with a frequency-encoded version of a second matrix as a fourth optical signal. The first multiplexer, which is operably coupled to the first and third SSB-SC modulators, multiplexes the first optical signal and the third optical signal onto the beam splitter. Similarly, the second multiplexer, which is operably coupled to the second and fourth SSB-SC modulators, multiplexes the second optical signal and the fourth optical signal onto the beam splitter. And the photodetector detects a second heterodyne interference signal between the third and fourth optical signals that includes frequency-encoded products of elements of the second input vector and elements of the second matrix.

Other versions of the optical processor can perform spatially multiplexed computations. In some of these versions, the input vector is a first input vector, the beam splitter is a first beam splitter, the photodetector is a first photodetector, and the heterodyne interference signal is a first heterodyne interference signal. These versions may also include a third SSB-SC modulator, a second beam splitter, and a second photodetector. In operation, the third SSB-SC modulator modulates a third copy of the optical carrier with a frequency-encoded version of a second input vector as a third optical signal. The second beam splitter, which is in optical communication with the second and third SSB-SC modulators, combines the second and third optical signals. And the second photodetector detects a second heterodyne interference signal between the second and third optical signals that includes frequency-encoded products of elements of the second input vector and elements of the matrix.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

as a 10×1 input vector to the MZM, and gradually increasing the amplitude of the input vector until it reached the nonlinear regime of the MZM. The curve fit is of an analytical model to the experimental data.

Figures 5A, 5B:
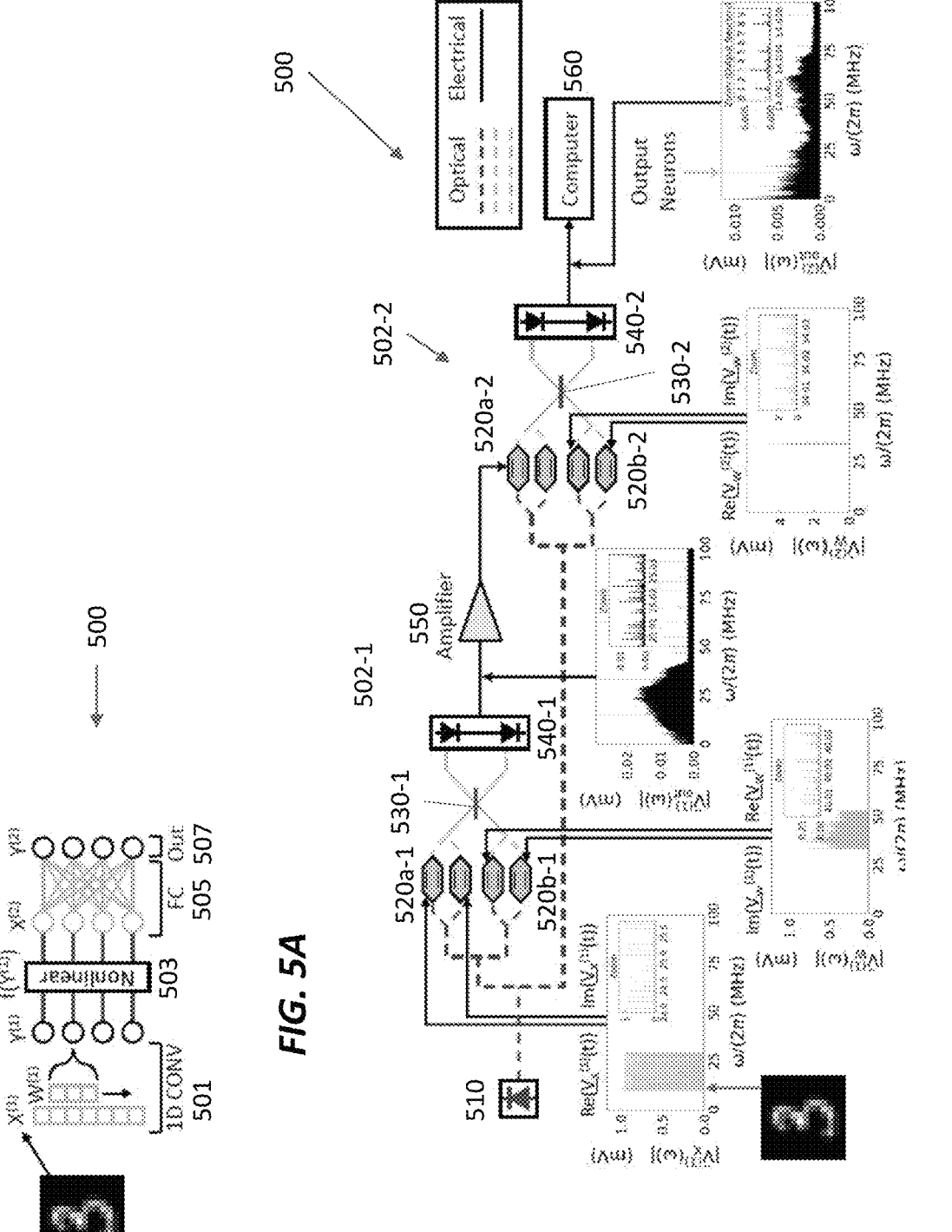
FIG. 5A illustrates a three-layer DNN with a 1D convolution (1D CONV) layer, followed by a nonlinearity and then a fully connected (FC) layer.
FIG. 5B shows a MAFT-ONN that implements the three-layer DNN of FIG. 5A.
Figures 5C, 5D, 5E:
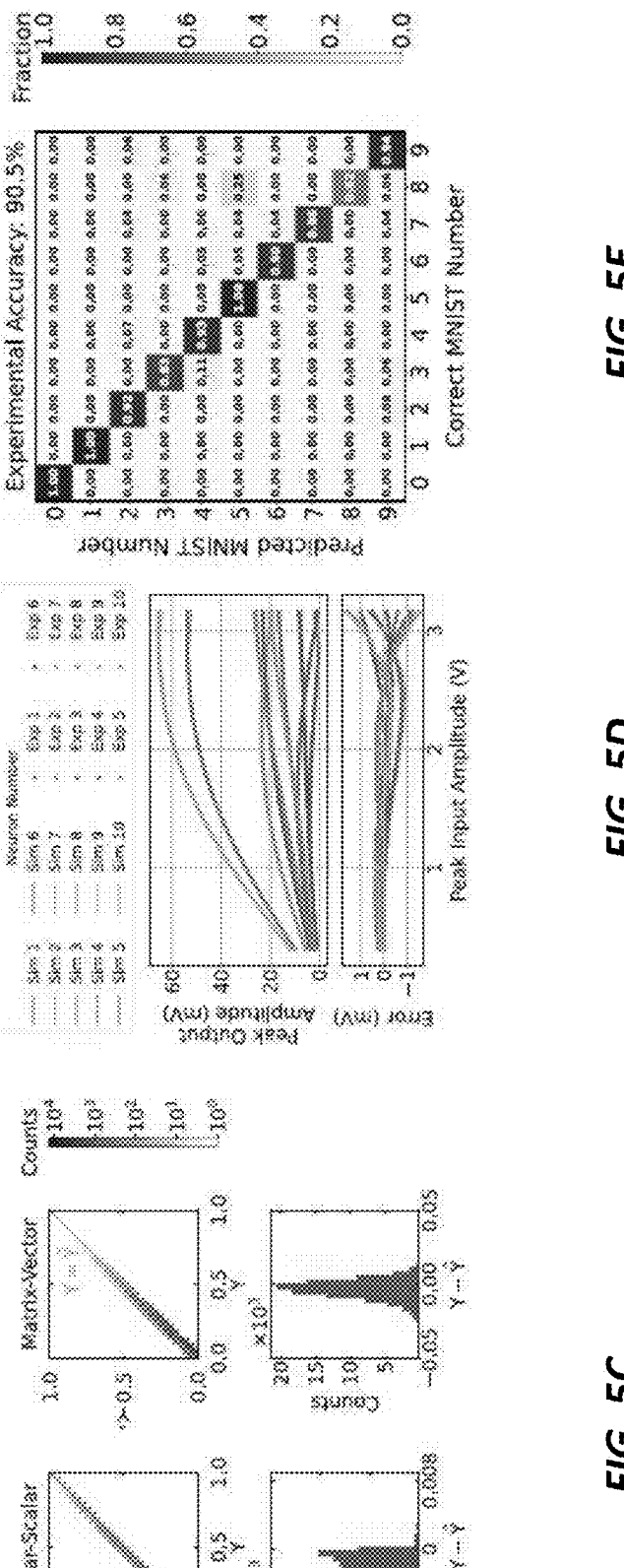
FIG. 5C shows 2D histograms (upper plots) that compare the experimental output values Ŷ to the expected curve fitted value Y and 1D histograms (lower plots) of the error Y-Ŷ for the MAFT-ONN in FIG. 5B. The scalar-scalar plot contains 10,000 randomized 1×1 matrix products, yielding nine-bit precision compared to the curve fit. The matrix-vector plot contains 10,000 randomized 10×10 matrix products (thus 100,000 values), yielding eight-bit precision.
FIG. 5D shows an experimental characterization of the nonlinear activation function of a Mach-Zehnder modulator (MZM) derived by programming $$V_X^{(1)}(t)$$

FIG. 5E shows a confusion matrix of the experimental three-layer MAFT-ONN shown in FIG. 5B over 200 14×14 MNIST images, yielding an experimental accuracy of 90.5%.

Figures 6, 7:
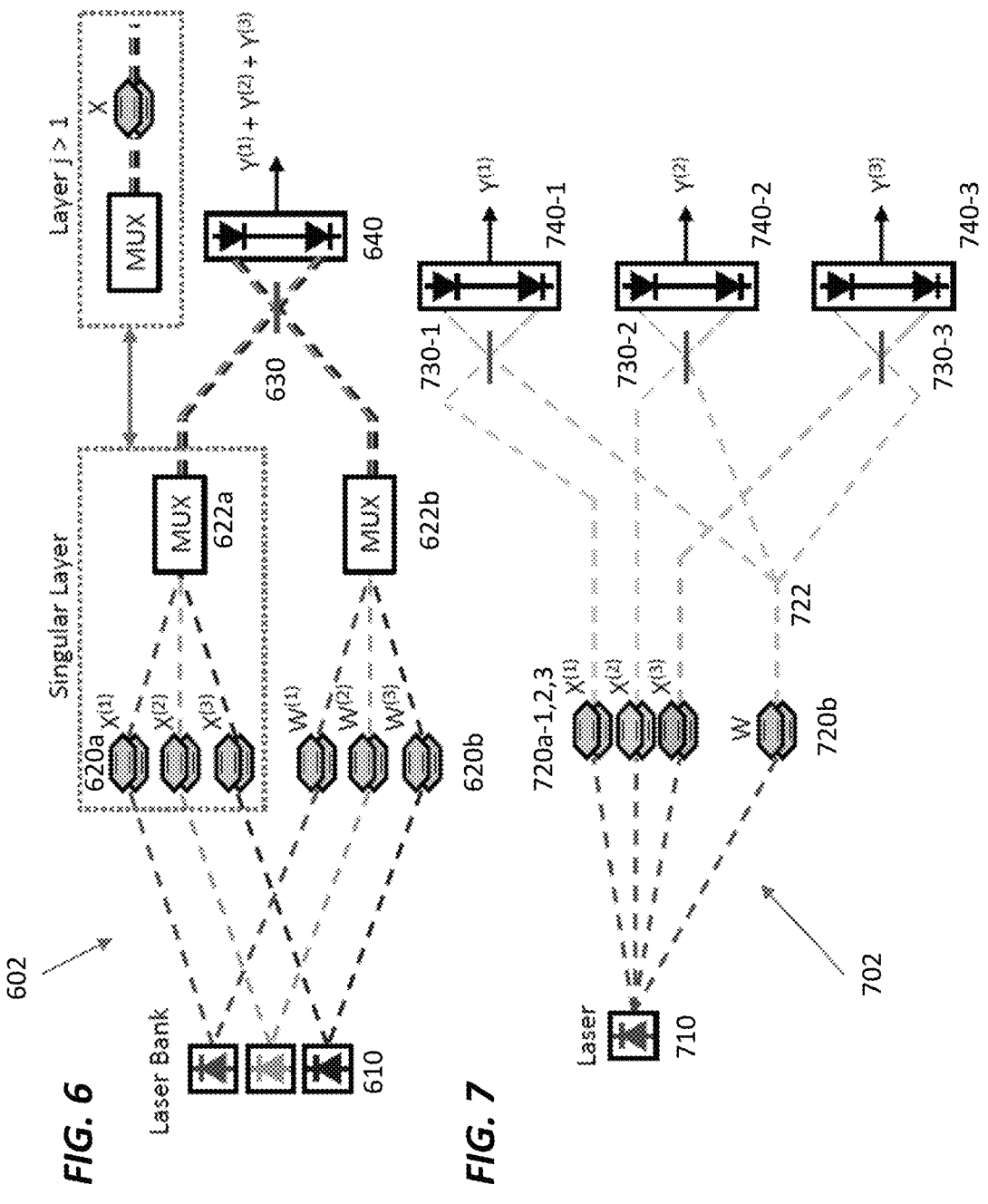

FIG. 6 shows a wavelength-division multiplexed (WDM) version of the MAFT-ONN architecture that expands the bandwidth-limited throughput to the wide bandwidth available in optics. Several matrix-vector products can be independently computed on different laser wavelengths, where the WDM output incoherently sums of the independent output vector signals from each laser.

FIG. 7 is a spatially multiplexed version of the MAFT-ONN architecture that uses optical fan-out to reuse the weight matrix for multiple input vectors. Spatial multiplexing can increase both throughput and energy efficiency.

Figure 8:
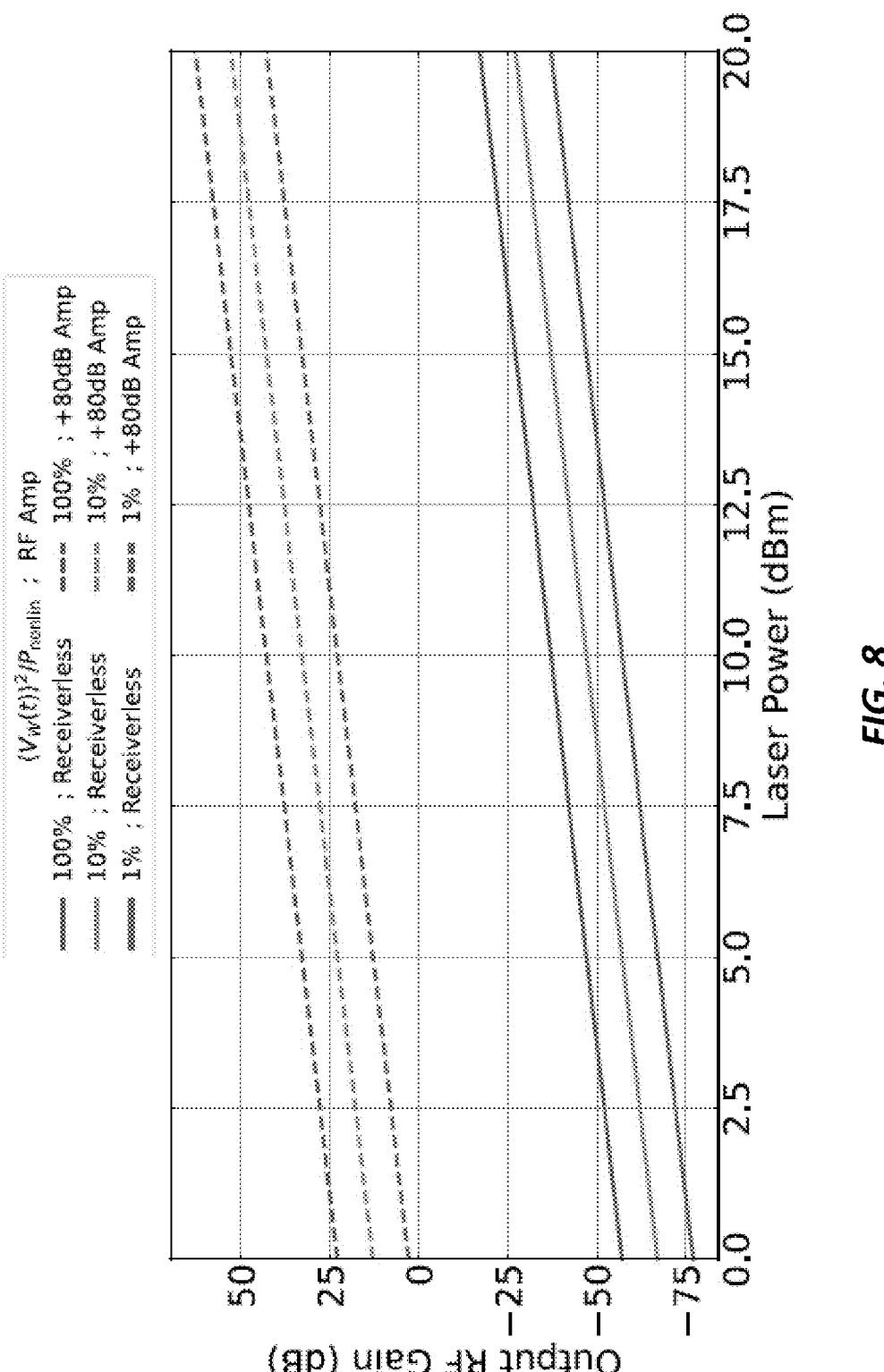

FIG. 8 shows a communication link gain analysis, illustrating the trade-space between the laser power, weight signal power, and RF amplifier gain. The weight signal can be any power as long as it stays within the linear regime of the modulator, where nonlinear power threshold of the modulator is $P_{nonlin}$.

Figure 9:
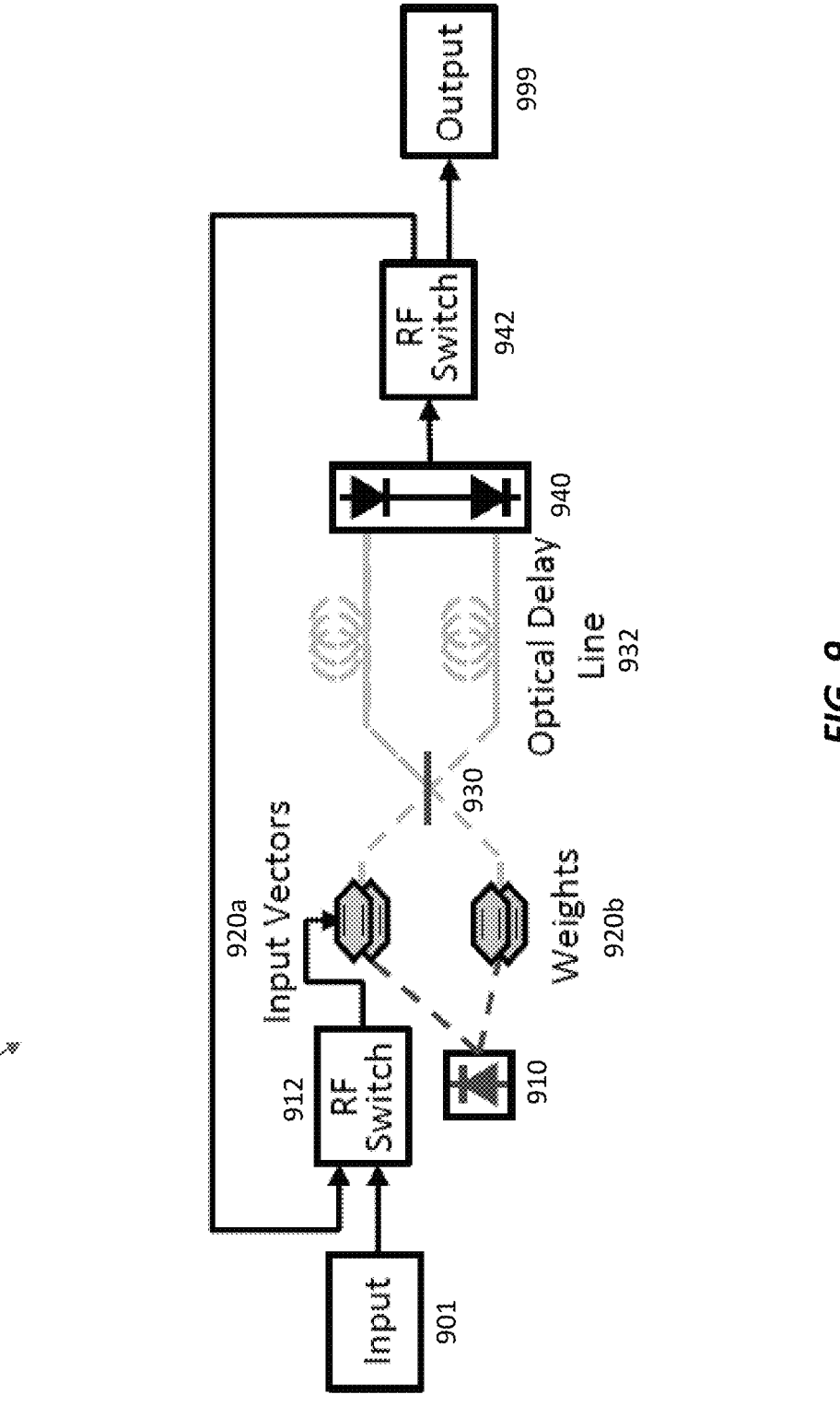

FIG. 9 illustrates a loop version of the MAFT-ONN that can implement an arbitrary number of layers with a signal set of modulators. A fiber delay line can be used to allow time for the RF weight values to update for each layer and for the RF switches to route the data.

DETAILED DESCRIPTION

In a multiplicative analog frequency transform optical neural network (MAFT-ONN), the input activations and weights are both frequency-encoded onto RF (or any other frequency band) signals that are transduced into the optical domain using a pair of dual-parallel Mach-Zehnder modulators (DPMZMs) or other single-sideband suppressed-carrier modulators (e.g., a normal MZM with an output filter), which are themselves in different arms of a Mach-Zehnder interferometer. A frequency-encoded signal is a signal where each element of data (e.g., each neuron in a neural network) is physically represented by both the magnitude and phase of a frequency mode. (Each frequency mode can have an independently programmed magnitude and phase.) A vector or matrix is defined by a signal that contains a group of frequency modes, where each frequency mode is at a different frequency. Using both the magnitude and phase of the frequency modes enables fully analog computations on (1) positive and negative real numbers and on (2) complex numbers. Arithmetic using both positive and negative elements is usually difficult for analog hardware accelerators.

The frequency encoding can be in the RF domain or it can also be optical frequency encoding (such as with optical frequency combs) or frequency encoding within any frequency for wavelength domain, as long as one can multiply and detect the frequency-encoded signals. In this optical implementation, the input and weight signals are multiplied by mixing the signals with a directional coupler or beam splitter and applying heterodyne detection to the output of the directional coupler. The frequencies of the weights are chosen so that the output of the photoelectric multiplication yields a matrix multiplication of the inputs and weights. The output of the photoelectric multiplication contains spurious frequencies that can be filtered out before the next layer in the RF domain using a bandpass or periodic filter.

For example, if the input activation is an image, it is attenuated and converted into a frequency comb. Then, based on the chosen frequency content of the input signal, the frequency content of the weight signal is chosen such that the output of the heterodyne multiplication yields a matrix multiplication. The frequency combs representing the input activation and the weight signal drive the different DPMZMs to produce modulated outputs that are mixed at a balanced pair of differential photodetectors. Next, bandpass filters remove unwanted sidebands from the outputs of the photodetectors to produce filtered output signals. Each filtered output signal is another frequency comb, so the output can be cascaded several times to achieve a DNN with an arbitrary number of layers without any digital processing or computers in between layers.

It is also possible to loop the output back into the original Mach-Zehnder interferometer using a delay line, allowing for an unlimited number of layers of a DNN with a single interferometer. The MAFT-ONN can scalably run inference with multiple layers without a digital interface between each layer.

The nonlinear behavior of the DPMZMs acts as or provides the nonlinear activation in the analog domain. The nonlinearity of each layer is applied during the transduction of the RF signal into the optical domain with the Mach-Zehnder modulator. In a MAFT-ONN with multiple layers, the nonlinearity of layer (j−1) is applied using a DPMZM in the layer j (the previous layer). The mathematical behavior of the nonlinearity is to take the sine of a sum of weighted sinusoids. This produces a unique behavior where the value of one neuron affects the nonlinear behavior of other (e.g., all) neurons. Simulations using MNIST show that neural networks can indeed train on this nonlinearity and achieve accuracies on par with conventional nonlinearities like rectified linear unit (ReLU) nonlinearities.

Figures 1, 3:
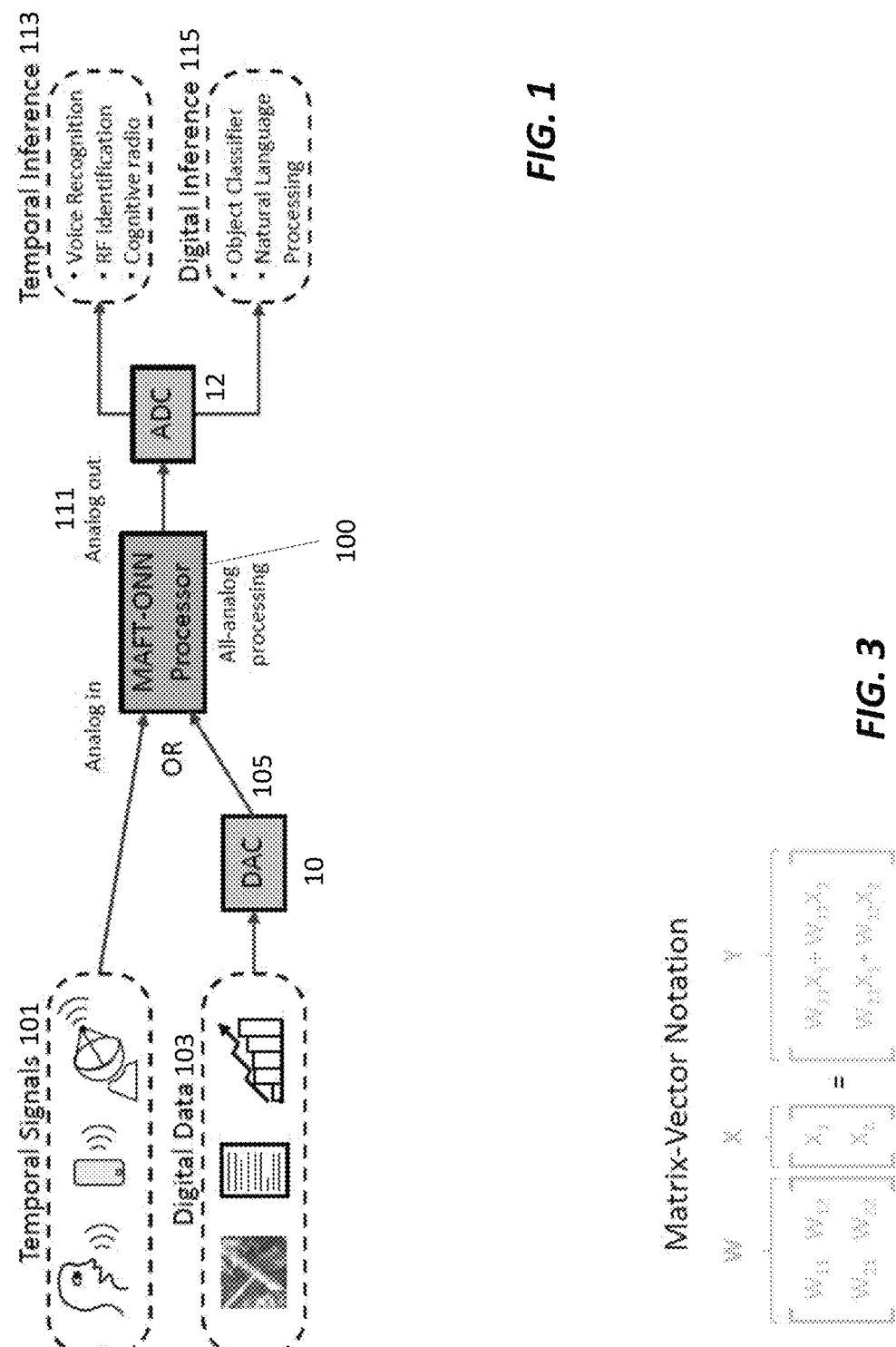
FIG. 1 illustrates a multiplicative analog frequency transform optical neural network (MAFT-ONN) that can be used to generate temporal inferences from temporal analog input signals, such as voice and radio frequency (RF) waveforms.
FIG. 3 illustrates notation for a typical 2×2 matrix multiplication between a matrix W and a vector X.

FIG. 1 shows a MAFT-ONN processor 100 that processes analog input signals. These signals can be analog temporal signals 101, such as voice or radio-frequency (RF) signals, or digitized signals 105 generating from digital signals 103 using a digital-to-analog converter (DAC) 10. The MAFT-ONN processor 100 generates analog output signals 111 from these analog input signals using frequency-encoded neurons for convolutions and matrix multiplication as described in greater detail below. The frequency encoding allows scalable throughput increases without sacrificing speed or being limited by the number of spatial modes. The analog output signals 111 can be digitized with an analog-to-digital converter (ADC) 12 to produce temporal inferences 113, such as voice recognition or RF identification data, or digital inferences 115, such as object classifications or processed natural language information.

The architecture of the MAFT-ONN processor 100 yields much flexibility for running various types and sizes of deep neural networks (DNNs). The nonlinear activation is performed on a single component, the Mach-Zehnder modulator (MZM), making both the linear and nonlinear operations scalable and low-cost. The MAFT-ONN processor is suitable for the direct inference of temporal data and can achieve real-time inference of the signals with speed-of-light limited latency. When using the full optical bandwidth and spatial multiplexing, the throughput of this system is competitive with other state-of-the-art DNN hardware accelerators. Outside of DNN hardware acceleration, this architecture also has applications for signal processing. For example, by setting the weight matrix to an identity matrix, this system can take a multi-tone input signal and perform arbitrary frequency transformations without changing the information content of the signal.

More generally, the MAFT architecture can be used to encode inputs and weights in the frequency domain, then mix them/multiply them together to produce an output that is also in the frequency domain. Physically, this corresponds to a convolution of the frequency modes that can be left as a convolution or mapped to a matrix-vector product. The MAFT-ONN architecture uses the MAFT architecture to implement a DNN, with convolutional layers that leave the outputs as convolutions and fully connected (FC) layers map the outputs to matrix-vector products.

MAFT-ONN Architecture

Figures 2A, 2B, 2C:
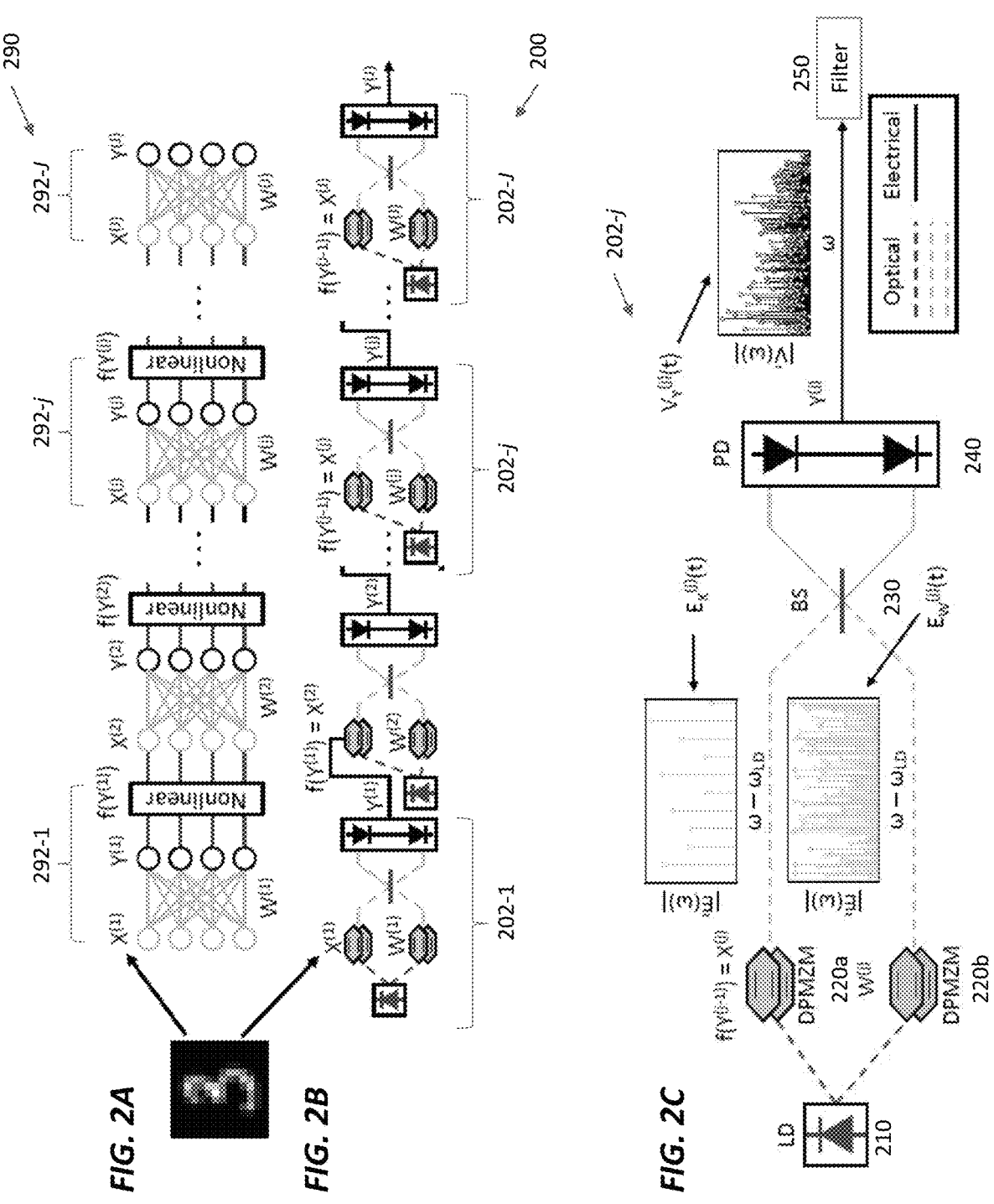
FIG. 2A illustrates an arbitrarily long deep neural network (DNN), where each layer performs a matrix-vector multiplication and a nonlinear activation.
FIG. 2B illustrates the MAFT-ONN architecture, where both the inputs and weights are encoded in the frequency domain and then modulated onto optical carriers, with photodetectors that perform photoelectric multiplication to yields the linear matrix-vector product for each layer and dual-parallel Mach-Zehnder modulators (DPMZMs) to provide the nonlinear activations.
FIG. 2C shows a detailed view of a single layer in a MAFT-ONN. The DPMZM of the current layer j acts as the nonlinear activation function for the previous layer j−1. The weight matrix signal is programmed to yield the matrix-vector product while simultaneously transforming the input vector frequencies into a chosen set of output vector frequencies.

FIG. 2A illustrates a generic DNN 200 with a series of layers 292 indexed from j=1 . . . J, including an input layer 292-1, at least one hidden layer 292-j, and an output layer 292-J that yields the processed data. As seen in FIG. 2B, these DNN layers 292 map to a series of photonic hardware layers 202 in a MAFT-ONN processor 200. These photonic hardware layers 202 are also indexed from j=1 . . . J and include an input layer 202-1, at least one hidden layer 202-j, and an output layer 202-J.

FIG. 2C shows an arbitrary photonic hardware layer 202-j with N input and R output neurons that performs a matrix-vector multiplication as described below. The photonic hardware layer 202-j includes a laser diode (LD) 210 coupled in parallel to a pair of dual-parallel Mach-Zehnder modulator (DPMZMs) 220a and 220b (collectively, DPMZMs 220), which are coupled in turn a balanced photodetector (PD) 240 via a 50:50 beam splitter (BS) 230. (Alternatively, each DPMZM 220 can be replaced by a regular MZM followed by a passive ring filter to achieve SSB-SC modulation.) In operation, the laser diode 210 emits an optical carrier modulated by the DPMZMs 220, which are driven by respective analog RF signals. For inference processing, these analog RF signals can be an input vector $X^{(j)}$ with a size N×1 for DPMZM 220a and a weight matrix $W^{(j)}$ with a size R×N for DPMZM 220b. The beam splitter 230 combines the outputs of the DPMZMs 220 for detection by the balanced differential photodetector 240, which produces the output of the photonic hardware layer 202-j as an analog electrical signal that encodes an output vector $Y^{(j)}=W^{(j)}X^{(j)}$ of size R×1. A filter coupled to the output of the balanced differential photodetector 240

To perform matrix algebra, the values of the input vectors $X^{(j)}$ and $W^{(j)}$ and the output vector $Y^{(j)}$ are all contained in frequency-encoded signals. The input vector to photonic hardware layer 202-j, $X^{(j)}$, begins as an optical field $$E_X^{(j)}(t),$$

which is the result of modulating the output of the laser diode 210 via DPMZM 220b, which is driven by the photovoltage output of the previous photonic hardware layer 202-j−1, j−1. If the neuron values of $X^{(j)}$ have a frequency spacing $\Delta\omega_X$ and offset $n_0 \cdot \Delta\omega_X$, then the frequency encoded signal for $X^{(j)}$ is:

$$E_X^{(j)}(t) \propto \sum_{n=1}^{N} X_n^{(j)} e^{i((n_0+n)\Delta\omega_X + \omega_{LD})t},$$

where $\omega_{LD}$ is the laser frequency.

The weight matrix $W^{(j)}$ also begins as an electrical signal, $$V_W^{(j)}(t).$$

Encoding $$V_W^{(j)}(t)$$

so that the output vector $Y^{(j)}$ has frequency spacing $\Delta\omega_Y$ and offset $r_0 \cdot \Delta\omega_Y$ and modulating $$V_W^{(j)}(t)$$

on DPMZM 220b, the weight matrix optical field is:

$$E_W^{(j)}(t) \propto \sum_{r=1}^{R}\sum_{n=1}^{N} W_{r,n}^{(j)} e^{i((r_0+r)\Delta\omega_Y + (n_0+n)\Delta\omega_X + \omega_{LD})t}.$$

The plot at upper right in FIG. 2C shows the frequency content $|\tilde{E}(\omega)|$ of the optical input $$E_X^{(j)}(t)$$

and weights $$E_W^{(j)}(t),$$

where the tilde over a variable indicates its Fourier Transform. Both of these signals are single-sideband with respect to the laser carrier.

Sending $$E_X^{(j)}(t) \text{ and } E_W^{(j)}(t)$$

through the 50:50 beam splitter 230 onto the balanced photodetector 240 produces a photovoltage $$V_{out}^{(j)}(t) \propto \text{Im}\left[(E_X^{(j)}(t))^* E_W^{(j)}(t)\right] \\ \propto V_Y^{(j)}(t) + V_S^{(j)}(t), \tag{1}$$

ignoring linear scaling factors (see below for the link gain analysis). Here, the partial sums of $Y^{(j)}$ sum coherently in the frequency domain to yield the desired matrix product in a single shot:

$$V_Y^{(j)}(t) \propto \sum_{r=1}^{R} Y_r^{(j)} \sin((r_0 + r)\Delta\omega_Y t).$$

Thus, the MAFT-ONN processor 200 transforms an input signal with frequency spacing $\Delta\omega_X$ into an output signal with spacing $\Delta\omega_Y$ while simultaneously computing a matrix-vector product. Since the inputs and weights are multiplied in the time domain as shown in Equation (1), they are convolved in the frequency domain: $E_X(t) \cdot E_W(t) \Leftrightarrow \tilde{E}_X(\omega) * \tilde{E}_W(\omega)$. Hence, the MAFT-ONN processor 200 maps this frequency domain convolution to a matrix-vector product.

The output signal $$V_S^{(j)}(t)$$

from the jth photonic hardware layer contains spurious frequency content that does not contribute to the matrix-vector product. This spurious frequency content corresponds to extraneous elements of the one-dimensional, frequency-domain convolution of the matrix and the vector. In practice, the MAFT-ONN processor 200 computes a fully connected layer by eliminating $$V_S^{(j)}(t)$$

using the passive RF bandpass filter 250 and/or RF cavities/optical ring (not shown) resonators with a free-spectral range equal to $\Delta\omega_Y$. It can compute a convolutional layer by retaining $$V_S^{(j)}(t).$$

The photonic hardware layer 202-$j$ achieves a nonlinear activation f(•) by applying $$V_Y^{(j)}(t)$$

to the nonlinear regime of the MZM, yielding the optical input to the next layer j+1:p $$f(V_Y^{(j)}(t)) = E_X^{(j+1)}(t) \\ = \chi_0 + \chi_1 e^{i\omega_{LD}t} \cdot H_a\left[\sin(\chi_2 V_Y^{(j)}(t) + \chi_3)\right]. \tag{2}$$

Here, $\chi_0$ contributes to the DC offset; $\chi_1$ depends on the laser power, insertion loss, and propagation loss; $\chi_2$ depends on the $V_\pi$ and efficiency of the MZM; and $\chi_3$ depends on the bias conditions and natural bias point of the MZM. These four parameters can be programmed to control the strength of the nonlinearity. The function $H_a[\bullet]$ is the analytic Hilbert transform, which removes the negative frequency components from the sinusoids (making them complex-valued) to ensure that $$E_X^{(j+1)}(t)$$

is single-sideband with respect to the laser carrier just like $$E_X^{(j)}(t) \text{ and } E_W^{(j)}(t).$$

Thus, the MZM simultaneously encodes the next layer's input vector while also implementing the nonlinear transformation on $$V_Y^{(j)}(t).$$

The Fourier transform of $$E_X^{(j+1)}(t)$$

(written in the time domain in Equation (2)) reveals an unusual property of f(•): in a MAFT-ONN, the nonlinearity applied to one neuron $$Y_r^{(j)}$$

depends on all neurons via an expression of the form $$f(Y_r^{(j)}, Y_1^{(j)}, \dots, Y_R^{(j)}),$$

whereas f(•) acts element-wise on each vector component in a conventional DNN. This 'all-to-all' nonlinearity can be incorporated into the training procedure (see below) for conventional DNN tasks.

A single layer 202 of the MAFT-ONN processor 200 can perform matrix-matrix multiplication via time or frequency-multiplexing of the input vector $V_X(t)$. For time-multiplexing, M input vectors are appended in the time domain; this corresponds to batching several inputs to be inferred by the same weight matrix. Frequency multiplexing is described below with respect to FIG. 6. Here, the frequencies are equally spaced to increase or maximize the throughput of the matrix-vector computations.

2×2 Matrix Multiplication with a MAFT Matrix-Vector Multiplier

Figures 4A, 4B:
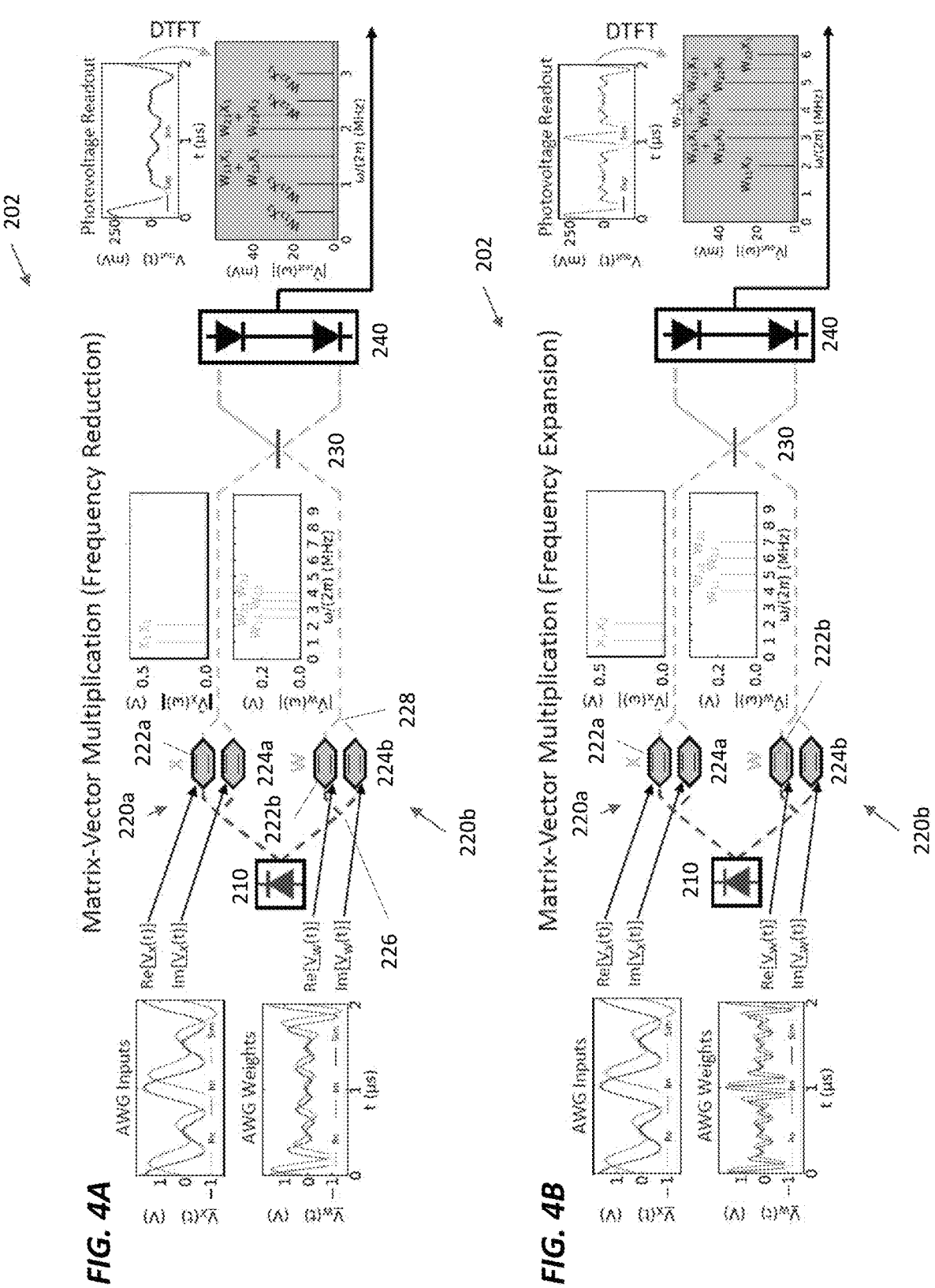
FIG. 4A illustrates frequency reduction with a MAFT-ONN, where $V_W(t))$ is programmed to yield a matrix-vector product where $\Delta\omega_Y<\Delta\omega_X$. The spurious frequencies (gray regions in righthand plot) are pushed to either side of the neuron frequencies. The unique partial sum terms contained in the spurious frequencies of $V_{out}(t)$ can be removed with a bandpass filter or used to train a DNN.
FIG. 4B illustrates frequency expansion with a MAFT-ONN, where $V_W(t)$ is programmed so that $\Delta\omega_Y>\Delta\omega_X$. As with the frequency reduction in FIG. 2B, the spurious frequencies in $V_{out}(t)$ can be removed with a periodic filter or used to train the DNN.

FIGS. 4A and 4B illustrate an experimental example of 2×2 matrix-vector multiplication using a single layer 202 of the MAFT-ONN processor 200. Because this single layer 202 performs matrix-vector multiplication, it is also called a MAFT matrix-vector multiplier 202. (FIG. 3 shows notation for keeping track of all the matrix and partial sum elements in the matrix-vector multiplication.) The input and weight electrical voltage signals $V_X(t)$ and $V_W(t)$, respectively, were generated by an arbitrary waveform generator (AWG; not shown) and then sent to DPMZMs 220.

As understood by those of skill in the art, a DPMZM 220 can be formed of two Mach-Zehnder modulators (MZMs) 222 and 224, also called sub-MZMs, that are coupled in parallel, with a 1×2 beam splitter 226 coupling the MZMs to the same optical source (laser diode 210) and a 2×1 beam splitter 228 combining the outputs of the MZMs 222 and 224. If appropriate, a quadrature hybrid coupler or other suitable device (not shown) coupled to the RF inputs of the MZMs 222 and 224 can split the electrical voltage signal into in-phase and quadrature components, with the in-phase component driving one MZM 222 and the quadrature component driving the other MZM 224. The MZMs 222 and 224 can be biased independently, if desired. Thanks to this configuration, the DPMZMs 220 can perform single-sideband suppressed carrier (SSB-SC) modulation of the electrical voltage signals onto optical carriers from the laser diode 210. Without SSB-SC modulation, the modulated signals would be dual-sideband and completely cancel each other out after the photoelectric multiplication.

To SSB-SC modulate an arbitrary signal, one copy of the signal (the in-phase component) is sent to one sub-MZM 222 of the DPMZM 220, and another 900 phase-shifted copy (the quadrature component) is sent to the other sub-MZM 224. Choosing an underbar to indicate an analytical Hilbert transform, $\underline{V}_X(t)=H_a[V_X(t)]$. Then $Re[\underline{V}_X(t)]=V_X(t)$ is the in-phase component, and $Im[\underline{V}_X(t)]$ is the 90° phase-shifted quadrature component. (Although the 900 phase-shifted component was generated using an AWG in this experiment, in deep neural nets this phase shift can be achieved using commercial wide-band passive RF phase shifters.)

FIGS. 4A and 4B show both components in the time domain since they have the same magnitude in the frequency domain. Each time-domain plot shows one period of the raw data as captured by an oscilloscope, and each frequency-domain plot shows the discrete time Fourier transform (DTFT) or the entirety of the corresponding oscilloscope trace.

In this example, the input vector $V_X(t)$ contains two frequencies, the matrix $V_W(t)$ contains four frequencies, and the output electrical voltage signal $V_{out}(t)$ contains a variable number of frequencies. In this experiment, the input vector $V_X(t)$ was kept the same while the matrix $V_W(t)$ was varied to demonstrate different effects.

In FIG. 4A, for example, $V_W(t)$ was programmed so that the frequency domain of $V_{out}(t)$ yields a matrix-vector product where the frequencies corresponding to the elements of Y are adjacently spaced in the middle of the spurious frequencies. In other words, the frequency encoding of the matrix was selected to yield the frequency-encoded products at frequencies in a band that does not include any of the spurious frequency content. This method of programming is called a frequency reduction scheme because $\Delta\omega_Y<\Delta\omega_X$.

FIG. 4B demonstrates an alternative method of programming $V_W(t)$, which intersperses the elements of Y with the spurious frequency components. This is called a frequency expansion scheme, as $\Delta\omega_Y>\Delta\omega_X$. In the frequency expansion scheme, the frequency encoding of the matrix was selected to yield the frequency-encoded products interspersed with the spurious frequency content.

The frequency reduction and expansion schemes can be used alternatively for consecutive layers of a DNN to avoid running out of bandwidth. Alternatively, as demonstrated by the experiment described below, keeping the spurious frequency components causes the layer 202 to behave as a convolutional layer and eliminates any requirement for filters that precisely match the neuron frequencies.

Each partial sum term in $V_{out}(t)$ in FIGS. 4A and 4B can be traced to difference between the input and weight frequencies. For example, in FIG. 4B, the partial sum term $W_{11}X_2$ derives from the product of $W_{11}$ at 2.5 MHz and $X_2$ at 2 MHz, where the difference between their frequencies causes $W_{11}X_2$ to appear at 0.5 MHz.

Experimental Implementation of a Multi-Layer MAFT-ONN

FIGS. 5A and 5B illustrate conceptual and experimental implementations, respectively, of a multi-layer MAFT-ONN 500. Conceptually, the MAFT-ONN 500 realizes a three-layer DNN. The first layer is a one-dimensional convolutional (1D CONV) layer 501 connected to a nonlinearity 503 whose behavior can be customized using optics surrounding the MZM and/or circuitry. For example, this circuitry can include linearization circuits and hardware that can be programmed to perform various strengths and types of nonlinearities. The nonlinearity 503 is connected in turn to a fully connected (FC) layer 505. The FC layer 505 connects to an output layer 507.

Experimentally, the two-layer MAFT-ONN 500 includes two photonic hardware layers 202-1 and 202-2, each of which includes a pair of DPMZMs 520a-1,2 and 520b-1,2; a beam splitter 530-1,2; and a balanced differential detector 540-1, 2 as described above with respect to FIG. 2C. A single laser 510 provides a coherent optical carrier (laser beam) to both pairs of DPMZMs 550. An RF amplifier 550 amplifies the output of the first balanced differential detector 540-1 to provide an amplified electrical voltage signal for driving one DPMZM 520a-2 in the second layer 502-2 of the MAFT-ONN 500. And a computer 560 coupled to the second balanced differential detector 540-2 digitizes and processes the output of the MAFT-ONN 500.

In the experiment, an AWG (not shown) generated electrical voltage signals representing the input vector $$V_X^{(1)}(t)$$

and weight matrices $$V_W^{(1)}(t), \text{ and } V_W^{(2)}(t),$$

$$V_{out}^{(2)}(t)$$

all of which are modulated into the optical carrier using the DPMZMs 220. The frequency reduction scheme from FIG. 4A was used to program appearing further up in the spectrum, as can be seen in the plot of $Y^{(2)}$ in FIG. 5B. Finally, the computer 560 digitally sampled and Fourier transformed the analog output of the second layer $$V_W^{(1)}(t),$$

$$V_{out}^{(2)}(t).$$

yielding $$V_{out}^{(1)}(t)$$

The inset of the plot at right in FIG. 5B shows that the MAFT-ONN 500 correctly classified the input as a "3."

Linear Characterization

To test linear matrix-vector multiplication, a spectrum analyzer measured the photovoltage response after the first layer 502-1. The spurious frequencies were kept for DNN training, so $$V_{out}^{(1)}(t)$$

$$V_{out}^{(1)}(t) = V_Y^{(1)}(t).$$

The RF amplifier 550 amplified by scanning the relevant part of the bandwidth to extract $$V_Y^{(1)}(t).$$

$$V_Y^{(1)}(t)$$

The input laser was modulated by to reach the nonlinear regime of DPMZM 520$a$-2 in the second layer 502-2. This DPMZM 520$b$-2 transduced the amplified electrical signal into an optical input signal $$V_X^{(1)}(t) \text{ and } V_W^{(1)}(t)$$

via DPMZMs in the linear regime. This multiplication was repeated over randomized values of $X^{(1)}$ and $W^{(1)}$ to obtain the full set of characterization data.

$$E_X^{(2)}(t)$$

Comparing a theoretical model to the experiment gives a measure of the accuracy of the matrix products. From Equation (2), the result of linearly modulating the input vector is:

in the second layer 502-2. For convenience, the amplified electrical signal drove only one sub-MZM of the DPMZM 520$a$-2, thus modulating $$
\begin{aligned}
f\left(V_X^{(1)}(t)\right) &= \chi_0 + \chi_1 e^{i\omega_{LD}t} \cdot H_a\left[\sin\left(\chi_2 V_X^{(1)}(t) + \chi_3\right)\right] \\
&\approx \chi_1 \chi_2 e^{i\omega_{LD}t} \cdot H_a\left[V_X^{(1)}(t)\right] \\
&\approx \chi_1 \chi_2 E_X^{(j)}(t)
\end{aligned}
$$

$$V_Y^{(1)}(t)$$

in the dual-sideband suppressed carrier (DSB-SC) mode.

For the second layer, the weight matrix where $\chi_0 = \chi_3 = 0$ in the linear regime. Similarly, the linear modulation of the weight matrix yields $$V_W^{(2)}(t)$$

$$f\left(V_W^{(1)}(t)\right) \approx \chi_1 \chi_2 E_W^{(1)}(t).$$

was programmed using the frequency expansion scheme from FIG. 4B. The multiplication of the DSB-SC modulated Therefore, from Equation (1), the resulting photoelectric multiplication is:

$$E_X^{(2)}(t)$$

and the SSB-SC modulated $$
\begin{aligned}
V_{out}^{(1)}(t) &= \chi_{PD}\text{Im}\left[\left(\chi_1\chi_2 E_X^{(j)}(t)\right)^* \chi_1\chi_2 E_W^{(j)}(t)\right] \\
&= \chi_{PD}(\chi_1\chi_2)^2\text{Im}\left[\left(E_X^{(j)}(t)\right)^* E_W^{(j)}(t)\right]
\end{aligned}
$$

$$E_W^{(2)}(t)$$

results in a copy of where $\chi_{PD}$ is determined by the responsivity of the photo-detector and the termination resistance.

Linear characterization is carried out with a one-parameter curve fit where the parameter estimates the value of $\chi_{PD}$ $(\chi_1\chi_2)^2$. The curve-fit parameter was obtained with a single randomized matrix-vector product whose amplitude was gradually increased to create a curve, where the slope of the curve is determined by $\chi_{PD}$ $(\chi_1\chi_2)^2$. The curve fit was re-calibrated whenever the size of the matrix-vector product being experimentally computed changed.

FIG. 5C shows the experimental matrix-vector multiplication performance of the two-layer MAFT-ONN 500 in FIG. 5B, where Y is the expected curved-fitted value of the output vector, and Ŷ is the experimental output vector. Both Y and Ŷ are normalized to the largest value among all the products. Characterizing scalar-scalar products by computing 10,000 randomized scalar-scalar multiplications and comparing them to the curve fitted analytical product yielded 9-bit precision. Computing 10,000 randomized 10×10 matrix-vector products yielded 8-bit precision.

Nonlinear Characterization

FIG. 5D shows a nonlinear curve fit for a simple intensity-modulated direct detection (IMDD) link in which an electrical input signal $$V_X^{(1)}(t)$$

is modulated onto an optical carrier by an MZM and then immediately detected with a photodetector. The output of the IMDD link can be modeled as:

$$V_{out}(t) = \chi_0 + \chi_{PD}\chi_1\sin\left(\chi_2 V_X^{(1)}(t) + \chi_3\right).$$

This is a 4-parameter curve fit for the nonlinear characterization (counting $\chi_{PD}\chi_1$ as a single parameter). FIG. 5D shows an example of curve fitting the analytical model to an experimental characterization of an MZM, where $$V_X^{(1)}(t)$$

is a 10×1 input vector.

Three-Layer Deep Neural Network (DNN) Inference

The MAFT-ONN 500 architecture in FIG. 5B was for the 3-layer DNN in FIG. 5A was trained to classify MNIST digits. FIG. 5A shows the DNN includes an input layer 501 of 196 neurons, one hidden layer of 39, 100 neurons 505, and an output layer 507 of 10 neurons, one for each of the MNIST digits. The first photoelectric multiplication of the MAFT-ONN 500 in FIG. 5B performs a one-dimensional convolution (1D CONV) and the second performs a matrix product for a sparse fully connected (FC) layer, as conveyed in FIG. 5A.

The input activation began with downsampled 14×14 MNIST images (FIGS. 5A and 5B show the MNIST image of a "3") that are represented by the frequency-encoded signal $$V_X^{(1)}(t)$$

containing 196 frequencies spaced at 100 kHz. The input activation was convolved by a weight kernel $$V_W^{(1)}(t)$$

containing 19,600 frequencies spaced at 1 kHz to yield the signal of the hidden layer, $$V_{out}^{(1)}(t).$$

Choosing a large weight kernel for the 1D CONV operation increased the density of parameters for the DNN. Next, the hidden layer $$V_{out}^{(1)}(t),$$

was multiplied by the second layer weight signal $$V_W^{(2)}(t),$$

which contained 1,000 frequencies spaced at 1 kHz to yield the output signal $$V_{out}^{(2)}(t).$$

The one-hot vector that represents the output MNIST values was implemented by randomly selecting a set of 10 adjacent frequencies among the spurious frequencies of $$V_{out}^{(2)}(t)$$

to demonstrate the flexibility of the MAFT-ONN scheme. The 10 output neuron frequencies were randomly chosen to be 14.03 MHz to 14.039 MHz, with 1 kHz spacing. The zoom of the plot of $$V_{out}^{(2)}(t)$$

in FIG. 5B shows the mapping of the neuron frequencies to the MNIST digits, where the digit is classified by the frequency mode with that largest magnitude.

Since the MAFT-ONN 500 performed coherent interferometry, the input vectors and weight matrices were each programmed with positive and negative neuron values. Negative neuron values were represented physically by a $\pi$ phase shift in that particular frequency mode, allowing for analog matrix algebra with negative numbers.

An analytic model of the hardware was used to train the DNN offline, similar to the nonlinear characterization discussed above. The offline training produced a set of weight matrices that were then encoded into the RF signals used for the experimental inferences.

The three-layer experimental DNN inferred 200 14×14 MNIST images, where the digital DNN had an accuracy of 95.5% and the experimental DNN had an accuracy of 90.5%. Ripples in the experimental nonlinear activation function contributed to the experimental inaccuracy. These ripples may have been due to the path length difference of the interferometer. A higher-power, low-noise amplified balanced photodetector would also increase the signal-to-noise ratio (SNR) of the signal going into the second photonic hardware layer 202-2. Additionally, performing the DNN training in-situ on the hardware itself could help better characterize it and increase the accuracy. FIG. 5E shows the confusion matrix of the experimental DNN.

The MAFT-ONN 500 in FIG. 5B is a scalable ONN that implements both linear and nonlinear operations in-line. Scalability in DNN width is achieved by a single interferometer implementing a single-shot convolution or matrix-vector product in the frequency domain, followed by another modulator implementing the nonlinear activation for an entire layer. In addition, the MAFT-ONN 500 is scalable in DNN depth because it can use the analog output of one layer as the input to the next layer for an arbitrary number of layers, all without digital processing.

Time-Based Signal Processing

A MAFT-ONN processor is a DNN hardware accelerator that is suitable for the direct inference of time-based signals like radio, voice recognition, and biological waveforms, which are already frequency-encoded when considering their Fourier transforms. In other DNN and ONN architectures, running inference for time-based signals requires the signal to be digitized and pre-processed to be compatible with the hardware, and one must choose how to handle complex-valued data. For example, for RF signal processing, other approaches involve processing the raw digital IQ data, hand-picking features, or converting a time-based signal into an image using a spectrogram. All of these approaches require digital processing before inference, which is problematic for real-time applications like cognitive radio, voice recognition, and self-driving cars, where ultra-low latency and high-bandwidth throughput are extremely beneficial. Conversely, a MAFT-ONN processor can process and compute complex values of IQ waveforms in the analog domain.

Computational Throughput

A processor's throughput T is a measure of the number of multiply-and-accumulates (MACs) computed by the processor within a given time. The number of MACs performed in a fully connected (FC) layer of a DNN with N input neurons and R output neurons is N·R. The time it takes to read out the output vector is the latency, which is $1/\min(\Delta f, f_0)$, where $\Delta f$ is the smallest frequency spacing of the output signal and $f_0$ is the lowest neuron frequency of the output signal ($2\pi f = \omega$, where $\omega$ is the angular frequency). The latency is the same as the period of the input, weight, and output signals, and thus is the minimum time it takes to create the frequency-encoded signals. Therefore, the throughput for an FC layer is:

$$T_{FC} = \frac{\# \text{ operations}}{\text{latency}} = N \cdot R \cdot \min(\Delta f, f_0).$$

Let B be the bandwidth available to modulate the input and weight signals. The throughput can be calculated in terms of the bandwidth B by plugging in the values of $\Delta f$ and $f_0$ based on how the inputs and weight frequencies are programmed. The specific method of programming the inputs and weights is determined by the anti-aliasing conditions that preserve the integrity of the matrix product after the photoelectric multiplication. This analysis yields the throughputs of the frequency reduction and expansion schemes, respectively, in an FC layer:

$$T_{reduction,FC} = \frac{2NR}{3NR + R + 1} B \approx \frac{2}{3} B, \tag{3}$$

$$T_{expansion,FC} = \frac{R}{1 + R} B \approx B. \tag{4}$$

The approximations for Equations (3) and (4) are valid for N>>1 and R>>1, respectively. Therefore, the maximum throughput of the MAFT-ONN architecture is ultimately limited by the available bandwidth, independent of DNN size. This is because for a given bandwidth limitation B, as the number of neurons increase, the frequency spacing decreases to keep the frequencies within the bandwidth. This trade-off yields very similar throughput regardless of the number of neurons or frequency spacing.

In the experiments presented above, the output of the first photonic hardware layer was not filtered, meaning that the first photonic hardware layer computed the one-dimensional convolution (1D CONV) between the inputs and weights. Thus, the throughput of a 1D CONV layer is:

$$T_{1D\,CONV} = \frac{\# \text{ operations}}{\text{latency}} = N^2 \cdot R \cdot \min(\Delta f, f_0)$$

$$T_{reduction,1D\,CONV} \approx \frac{2}{3} N \cdot B$$

$$T_{expansion,1D\,CONV} \approx N \cdot B$$

This convolutional throughput is unbounded in N, because in this case, the trade-off from decreasing the frequency spacing to allow for more neurons results in higher throughput. (The convolutional throughput yields a logarithmic advantage in N when compared to an operation like the convolution, which uses DTFTs for efficient computation.) Here, the limiting factor is the linewidth of each frequency mode that would prevent adjacent frequencies from being resolved.

The bandwidth B limiting the throughput is not the RF bandwidth of the electrical components, but the available optical bandwidth. The maximum throughput of the MAFT-ONN architecture can be realized by: (i) optical wavelength-division multiplexing (WDM) the frequency-encoded signals or (ii) replacing the frequency-encoded signals with optical frequency combs.

FIG. 6 shows a MAFT-ONN layer 602, or spectrally multiplexed matrix-vector multiplier, that uses optical WDM to simultaneously compute multiple matrix-vector products at different wavelengths on the same balanced differential photodetector 640. This layer 602 includes a bank of lasers 610, each of which emits an optical carrier (laser beam) at a different wavelength. Instead of two DPMZMs, it includes two banks of the DPMZMs 620a and 620b, with one DPMZM in each DPMZM bank 620a, 620b for each wavelength. Each DPMZM bank 620a, 620b is coupled to a corresponding wavelength-division multiplexer 622a, 622b, which multiplexes the outputs from the DPMZM bank 620a, 620b. A beam splitter 630 combines the multiplexed DPMZM outputs onto the two inputs of a balanced differential photodetector 640.

The layer 602 computes each matrix-vector product at a different wavelength/on a different optical carrier. The incoherence between the lasers 610 allows for each matrix-vector product to independently sum at the photodetector output. Setting the gaps between neighboring laser wavelengths (optical carrier frequencies) to be greater than the bandwidth of the photodetector means there should be no cross-coupling terms between the matrix-vector products.

With the WDM version of the architecture, large matrix products can be tiled in the frequency domain, or matrix-matrix products can be frequency-multiplexed while still computing everything in a single shot. The optical bandwidth can also be used in the case of an arbitrarily deep neural network (the box labeled "Layer j>1" in FIG. 6), where the same input vector can be independently multiplied by different weight signals for applications like convolution. There is more than 20 THz of available bandwidth among the S, C, and L telecommunication bands (1460-1625 nm) that can be used here for optical WDM. Moreover, optical frequency combs can replace the WDM modules in FIG. 6 for even larger throughput and optical frequency comb bandwidths of almost 1,000 THz. An optical frequency comb can be programmed or modulated with an AWG or waveshaper.

FIG. 7 shows a MAFT-ONN layer 702, or spatially multiplexed matrix-vector multiplier, that computes spatially multiplexed products of different vectors with the same matrix. This layer 702 includes a single laser source 710 that is coupled to a set of DPMZMs 720*a*-1, 2, and 3 that modulate different vectors onto different portions of an optical carrier emitted by the laser source 710 and a separate DPMZM 720*b* that modulates the matrix onto another portion of the optical carrier. A 1×3 beam splitter 722 coupled to the output of DPMZM 720*b* splits the matrix-modulated optical carrier into three copies—one for each input vector—and directs each copy to a different 1×2 beam splitter 730-1, 2, or 3, which combine the copies with the respective vector-modulated optical carriers from the other DPMZMs 720*a*-1, 2, and 3. Each 1×2 beam splitter 730-1, 2, and 3 is coupled to a corresponding balanced differential photodetector 740-1, 2, or 3. These photodetectors 740 generate electrical-domain outputs modulated with the respective matrix-vector products.

The three spatially multiplexed channels shown in FIG. 7 are just an example. Other spatially multiplexed matrix-vector multipliers may have more channels using photonic integrated circuits with densely packed MZMs (e.g., 48 MZMs on a single chip). The combination of using the full optical bandwidth (on the order of terahertz) and spatial multiplexing (on the order of a hundred channels) scales to peta-operations per second scale throughputs. Thus, MAFT-ONN technology is competitive with electronic counterparts like TPUs with throughputs greater than 400 tera-operations per second.

MAFT-ONN Physical Latency

The physical latency of the MAFT-ONN architecture is the time it takes for a signal that is already frequency-encoded to enter the system, go through the optical processing, and leave the system as an electrical output vector signal. (Thus, the time it takes for the signal to travel from "Analog in" to "Analog out" in FIG. 1.) The physical latency is different from the readout latency described above, which is the time it takes to distinguish the frequency modes of the output vector signal. The physical latency of the system in FIG. 2B, which has j DNN layers, is: $J \cdot (\tau_{MZM} + \tau_{PD} + \tau_{RF} + \tau_{prop})$, where $\tau_{MZM}$ is the reciprocal of the bandwidth of each MZM (in the DPMZMs), $\tau_{PD}$ is the reciprocal of the bandwidth of the balanced differential photodetector, $\tau_{RF}$ is the combined delay due to the bandwidth of additional RF components, such as bandpass filters or amplifiers, and $\tau_{prop}$ is the data movement in the form of propagation of the frequency-encoded electromagnetic waves.

The value of the reciprocal of the MZM bandwidth $\tau_{MZM}$ depends highly on the material used for the MZM. State-of-the-art commercial MZMs typically have up to 40 GHz bandwidth, contributing about 25 ps delay. The photodetector latency can be separated into the RC time constant and carrier transit time:

$$\tau_{PD} = \sqrt{\tau_{RC}^2 + \tau_{transit}^2}.$$

Whether the RC or carrier transit time dominates the latency depends on the photodetector design. State-of-the-art commercial photodetectors have up to 100 GHz bandwidth, thus contributing about 10 ps latency. The value of $\tau_{RF}$ is variable and depends on the use case; in some scenarios, the RF bandpass filter and amplifier are optional. If using a narrowband RF filter to remove spurious frequencies, then $\tau_{RF}$ may dominate the physical latency. Thus, one benefit of keeping the spurious frequencies is to reduce the latency.

Finally, the propagation time $\tau_{prop}$ is determined by the lengths of the optical and electrical paths. The frequency-encoded electromagnetic waves pass through these paths at approximately the speed of light, depending on the refractive index and waveguide properties. The combined length of the fiber-optical components typically adds tens of centimeters of optical path length, contributing about 300 ps of latency. The electrical RF connections contribute a similar latency. The optical path length can be shortened to tens of millimeters by switching from fiber optics to a photonic integrated circuit, reducing the latency to about 30 ps. Depending on the scenario, the latency of the MAFT-ONN architecture will be dominated by data movement at the speed of light, $\tau_{prop}$.

The latency for the experimental MAFT-ONN described above was measured at 60 ns using DPMZMs with 30 GHz bandwidth, a balanced photodetector with 45 MHz bandwidth, and an RF amplifier with 1 GHz bandwidth. In addition, the signal propagates through approximately 10 meters of optical fiber and RF coaxial cables. The dominant sources of latency in the experimental MAFT-ONN were $\tau_{PD} \approx 1/45 \text{MHz} \approx 25$ ns and $\tau_{prop} \approx (10 \text{ m})/(3 \cdot 10^8 \text{ m/s}) \approx 35$ ns.

The physical latency us independent of the maximum throughput. This is because the throughput is independent of the number of neurons and the frequency spacing. Therefore, for a given physical latency, one can increase the number of neurons (and thus decrease the frequency spacing) until the time it takes to resolve the frequency spacing exceeds the physical latency.

MAFT-ONN Power Consumption

The power consumption of the MAFT-ONN architecture primarily depends on the gain of the components and the power of the initial input vector signal. The gain of single layer of this architecture compares the power of an input electrical voltage signal to the power of the output photovoltage signal. It is expressed below:

$$g(\text{linear}) = \frac{\pi^2}{8} \left( \frac{R_{PD} \gamma P_{LD}}{V_\pi} \right)^2 R_i R_o |H_{PD}(f)|^2 \langle V_W^2(t) \rangle$$

where $R_{PD}$ is the responsivity of the photodetector, $\gamma$ is the gain of the optical link (modulator insertion loss, fiber propagation loss, optical amplifiers, etc.), $P_{LD}$ is the laser power, $V_\pi$ is the voltage required to reach w phase shift on the modulators, $R_i$ and $R_o$ are the input and output resistances, respectively, $H_{PD}(f)$ is the frequency response of the photodetector, and $$\langle V_W^2(t) \rangle$$

is the time-averaged power of the weight matrix signal. This equation is for a receiverless link (no RF amplifier following the balanced photodetector).

FIG. 8 illustrates a trade-space between laser power, weight signal power, and RF amplifier gain. In the trade-space plot, $V_\pi$ is 6 V, $R_{PD}$ is 1 A/W, $\gamma$ is −6 dB, $R_i$ and $R_o$ are 50Ω, and $H_{PD}$ is ½. Since the power of the weight signal can be adjusted to fit within the linear regime of any modulator, the gain curves are independent of the $V_\pi$ of the modulators and instead depend on $$\langle V_W^2(t) \rangle.$$

However, the $V_\pi$ still determines the threshold of nonlinear regime of the modulator implementing the nonlinear activation.

Experimentally, a DPMZM with $V_\pi \approx 6$ V did not exhibit nonlinear behavior until the RF input signal reached around $$P_{nonlin} = V_\pi^2/R_i \approx 27 \ dBm.$$

This RF input signal power threshold for nonlinear behavior can be reduced by reducing the MZM half-wave voltage. For example, an MZM with a half-wave voltage of $V_\pi \approx 1$ mV begins behaving nonlinearly when RF input signal power reaches $P_{nonlin} \approx -47$ dBm. This even allows for RF input signals with −85 dBm of power, which is typically considered the minimum usable power level for communications, to be amplified enough to reach the nonlinear regime. In some scenarios, the gain from the laser may allow for receiverless operation, and in others, an amplifier before or after the DPMZMs can boost the RF input signal power enough to reach the power threshold for nonlinear behavior.

Loop MAFT-ONN Processors

FIG. 9 shows a loop MAFT-ONN processor 900 that can compute an arbitrary number of DNN layers with a single pair of DPMZMs 920a and 920b. Like the MAFT-ONN photonic hardware layers described above, the loop MAFT-ONN processor 900 includes a laser 910, pair of DPMZMs 920a and 920b, beam splitter 930, and balanced differential detector 940. It also includes two RF switches 912 and 942 and optical fiber delay lines 932. The first RF switch 912 couples an input 901 to DPMZM 920a in a first state and the output of the balanced differential detector 940 to DPMZM 920a in a second state. The second RF switch 942 couples the output of the balanced differential detector 940 to the system output 999 in a first state and to the input of DPMZM 920a in a second state. The optical fiber delay lines 932 couple the beam splitter outputs to the balanced differential detector 940 and act as temporary optical storage to give time for the RF weights and data routing switches 912 and 942 to operate. Just 1 km of commercially available optical fiber used as a delay line is enough to enable MHz-speed RF switches 912 and 942. The loop version of the MAFT-ONN architecture can reduce the cost, hardware complexity, and power consumption for computing DNNs with many hidden layers.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of performing a computation on an input vector and a matrix, the method comprising:
 frequency encoding the input vector onto a first optical signal;
 frequency encoding the matrix onto a second optical signal; and
 detecting a heterodyne interference signal between the first optical signal and the second optical signal, the heterodyne interference signal including frequency-encoded products of elements of the input vector and elements of the matrix and spurious frequency content.

2. The method of claim 1, wherein the computation is a multiplication of the input vector and the matrix, the heterodyne interference signal further includes spurious frequency content, and further comprising:
 filtering the spurious frequency content from the heterodyne interference signal.

3. The method of claim 2, wherein filtering the spurious frequency content from the heterodyne interference signal comprises bandpass filtering the heterodyne interference signal.

4. The method of claim 2, wherein filtering the spurious frequency content from the heterodyne interference signal comprises applying periodic filtering to the heterodyne interference signal.

5. The method of claim 1, wherein the computation is a convolution of the input vector and the matrix.

6. The method of claim 1, wherein frequency encoding the input vector onto the first optical signal comprises modulating the first optical signal with a single-sideband suppressed-carrier (SSB-SC) modulator driven by a frequency-encoded version of the input vector.

7. The method of claim 6, wherein the first SSB-SC modulator is a dual-parallel Mach-Zehnder modulator comprising a first Mach-Zehnder modulator (MZM) in a first arm of a Mach-Zehnder interferometer and a second MZM in a second arm of the Mach-Zehnder interferometer and modulating the first optical signal with the first SSB-SC modulator comprises:
 driving the first MZM with an in-phase component of the frequency-encoded version of the input vector; and
 driving the second MZM with a quadrature component of the frequency-encoded version of the input vector.

8. The method of claim 1, further comprising:
 selecting a frequency encoding of the matrix to yield the frequency-encoded products at frequencies interspersed with the spurious frequency content.

9. The method of claim 1, further comprising:
 selecting a frequency encoding of the matrix to yield the frequency-encoded products at frequencies in a band that does not include any of the spurious frequency content.

10. The method of claim 1, wherein the input vector is an input activation vector to a layer of a neural network, the matrix is a weight matrix of the neural network, the frequency-encoded products represent an output of the layer of the neural network, and further comprising:
 modulating a third optical signal with the frequency-encoded products as an input activation vector of a subsequent layer of the neural network.

11. The method of claim 10, wherein modulating the third optical signal comprises driving a Mach-Zehnder modulator with the frequency-encoded products, and further comprising:
 applying a nonlinearity in the subsequent layer of the neural network via the Mach-Zehnder modulator.

12. An optical processor comprising:
 a laser to emit an optical carrier;
 a first single-sideband suppressed carrier (SSB-SC) modulator, in optical communication with the laser, to modulate a first copy of the optical carrier with a frequency-encoded version of an input vector as a first optical signal;
 a second SSB-SC modulator, in optical communication with the laser, to modulate a second copy of the optical carrier with a frequency-encoded version of a matrix as a second optical signal;
 a beam splitter, in optical communication with the first SSB-SC modulator and the second SSB-SC modulator, to combine the first optical signal and the second optical signal; and
 a photodetector, in optical communication with the beam splitter, to detect a heterodyne interference signal between the first optical signal and the second optical signal, the heterodyne interference signal including frequency-encoded products of elements of the input vector and elements of the matrix.

13. The optical processor of claim 12, wherein the first SSB-SC modulator is a dual-parallel Mach-Zehnder modulator (DPMZM) that comprises a first Mach-Zehnder modulator (MZM) in a first arm of a Mach-Zehnder interferometer and driven by an in-phase component of the frequency-encoded version of the input vector and a second MZM in a second arm of the Mach-Zehnder interferometer and driven by a quadrature component of the frequency-encoded version of the input vector.

14. The optical processor of claim 12, wherein the photodetector is a balanced differential photodetector.

15. The optical processor of claim 12, wherein the heterodyne interference signal further includes spurious frequency content, and further comprising:

a filter, operably coupled to the photodetector, to filter the spurious frequency content from the heterodyne interference signal.

16. The optical processor of claim 12, wherein the input vector is an input to a first layer of a neural network, the matrix is a weight matrix of the neural network, and further comprising:

a third SSB-SC modulator, operably coupled to the photodetector, to modulate a third copy of the optical carrier with heterodyne interference signal as an input to a second layer of the neural network.

17. The optical processor of claim 16, wherein the third SSB-SC modulator is configured to apply a nonlinearity of the neural network.

18. The optical processor of claim 12, wherein the laser is a first laser, the optical carrier is a first optical carrier at a first wavelength, the input vector is a first input vector, the matrix is a first matrix, and the heterodyne interference signal is a first heterodyne interference signal, and further comprising:

a second laser to emit a second optical carrier at a second wavelength different that the first wavelength;

a third SSB-SC modulator, in optical communication with the second laser, to modulate a first copy of the second optical carrier with a frequency-encoded version of a second input vector as a third optical signal;

a fourth SSB-SC modulator, in optical communication with the second laser, to modulate a second copy of the second optical carrier with a frequency-encoded version of a second matrix as a fourth optical signal;

a first multiplexer, operably coupled to the first SSB-SC modulator and the third SSB-SC modulator, to multiplex the first optical signal and the third optical signal onto the beam splitter; and a second multiplexer, operably coupled to the second SSB-SC modulator and the fourth SSB-SC modulator, to multiplex the second optical signal and the fourth optical signal onto the beam splitter, wherein the photodetector is configured to detect a second heterodyne interference signal between the third optical signal and the fourth optical signal, the second heterodyne interference signal including frequency-encoded products of elements of the second input vector and elements of the second matrix.

19. The optical processor of claim 12, wherein the input vector is a first input vector, the beam splitter is a first beam splitter, the photodetector is a first photodetector, the heterodyne interference signal is a first heterodyne interference signal, and further comprising:

a third SSB-SC modulator, in optical communication with the laser, to modulate a third copy of the optical carrier with a frequency-encoded version of a second input vector as a third optical signal;

a second beam splitter, in optical communication with the third SSB-SC modulator and the second SSB-SC modulator, to combine the third optical signal and the second optical signal; and a second photodetector, in optical communication with the second beam splitter, to detect a second heterodyne interference signal between the third optical signal and the second optical signal, the heterodyne interference signal including frequency-encoded products of elements of the second input vector and elements of the matrix.

20. The optical processor of claim 12, further comprising:

a switch, operably coupled to an output of the photodetector and an input to the first SSB-SC modulator, to switch the heterodyne interference signal between the input to the first SSB-SC modulator and an output of the optical processor.

* * * * *